United States Patent [19]
Holzinger

[11] 3,856,451
[45] Dec. 24, 1974

[54] DEVICE FOR PRODUCING MOLDINGS FROM FOAMABLE PLASTICS, MORE PARTICULARLY, POLYURETHANE

[75] Inventor: Karl Holzinger, Herford-Schwaren-moor, Germany

[73] Assignee: Herbert Kannegiesser Kommandilgesellschaft of Hollwiesen, Vlotho, Germany

[22] Filed: May 24, 1973

[21] Appl. No.: 363,698

[30] Foreign Application Priority Data
May 26, 1972 Germany............................ 7219751

[52] U.S. Cl................... 425/429, 264/51, 264/310, 425/435, 425/817 R
[51] Int. Cl............................................. B29c 5/04
[58] Field of Search ....... 425/429, 4, 817, 425, 435, 425/402, 404, 405 R, 405 H; 164/292, 115, 323–326; 264/45, 50, 51, 94, 310, 311, 327

[56] References Cited
UNITED STATES PATENTS
| | | | |
|---|---|---|---|
| 3,474,165 | 10/1969 | Rakes et al. | 425/402 X |
| 3,514,508 | 5/1970 | Schott et al. | 425/404 X |
| 3,788,792 | 1/1974 | Suzuki | 425/409 |

*Primary Examiner*—R. Spencer Annear
*Assistant Examiner*—Mark Rosenbaum
*Attorney, Agent, or Firm*—Sughrue, Rothwell, Mion, Zinn & Macpeak

[57] ABSTRACT

A fluid operated pressure mold is gimballed for rotation about a first axis parallel to the direction of mold movement through a U-shaped yoke, which is in turn rotatably mounted near its mid point to a base pedestal about a horizontal axis perpendicular to the first axis.

2 Claims, 3 Drawing Figures

3,856,451

DEVICE FOR PRODUCING MOLDINGS FROM FOAMABLE PLASTICS, MORE PARTICULARLY, POLYURETHANE

BACKGROUND OF THE INVENTION

1. Field of the Invention

The present invention relates to a device for producing moldings from foamable plastics, more particularly, polyurethane. The two part mold in which the moldings are rendered into foam is arranged in a mold support pivotable about at least a first axis disposed in the direction of the closing movement of the mold, and about a second axis arranged at right angles to the first axis in the center of concentration of the mold support.

2. Prior Art

In the case of the known devices having the above construction, the second axis is arranged on both sides of the mold support on the frame of the device. As a result, the mold support, and thus the molding space located within the same, are only accessible to a limited degree. This is particularly disadvantageous if these devices are so dimensioned that they are only suitable for producing small and/or medium sized moldings. Among other reasons, this is largely because the mold support and the molding space are then only fully accessible, from a practical point of view, from two sides. This makes it difficult to insert and remove the molds and/or to remove the foamed moldings from the molds and/or to clean the molds easily.

SUMMARY OF THE INVENTION

The object of the invention is to provide a device of the type mentioned above, which is suitable in particular for the production of small and medium moldings, and which does not possess the above-mentioned disadvantages of the known devices.

The device according to the invention is characterized in that both ends of the first axis pass through the arms of a U-shaped bow disposed about the mold support. This U-shaped bow is mounted on the frame on its rear stem side along the second axis.

By means of this arrangement of the second axis, the mold support is completely accessible from three sides, thus making it easy to insert and remove the molds, to remove the foamed moldings from the molds, and to clean the molds.

It is also advantageous to design the mold support of the device such that it comprises a table-like clamping plate, a pressure yoke, a traverse rod, and two guide and displacement devices for the pressure yoke. The guide and displacement devices are disposed opposite to each other in an offset position, approximately along the line of a diagonal of the clamping plate, and the guide rods of the guide and displacement devices simultaneously connect together the clamping plate and the traverse rod.

By constructing the mold support in this way, the accessibility to the molding space, which is already relatively good owing to the positioning of the second axis according to the invention, is still further improved.

Other advantageous features of the invention will be made apparent from the following description of a preferred embodiment thereof, provided with reference to the accompanying drawings in which:

DESCRIPTION OF THE PREFERRED EMBODIMENTS

Figure 2:
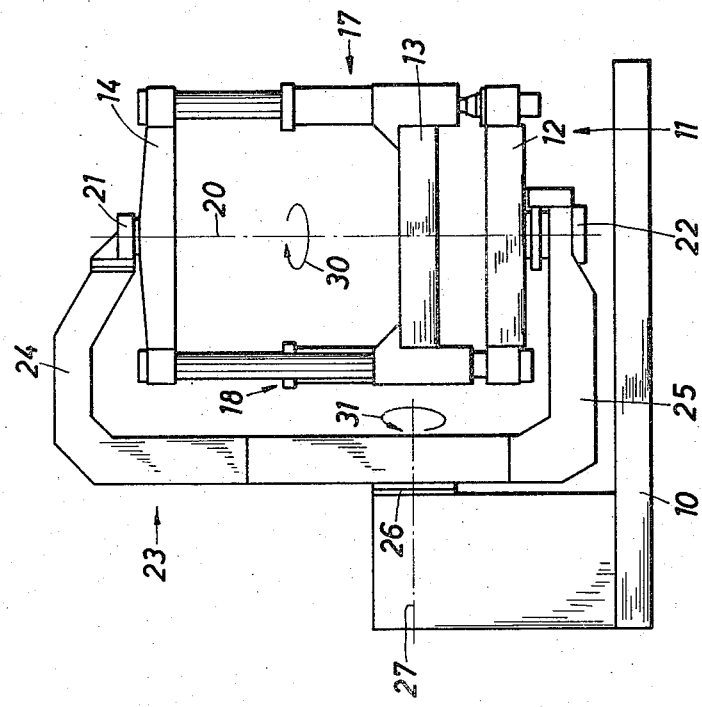
FIG. 2 is a side view of FIG. 1.
Figure 1:
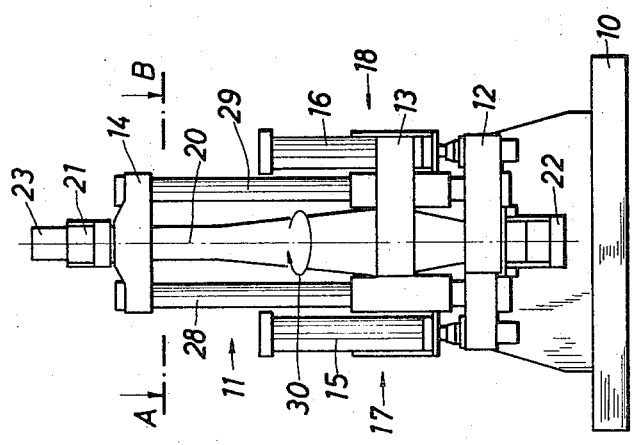
FIG. 1 is a diagrammatic front view of the device according to the invention.
Figure 3:
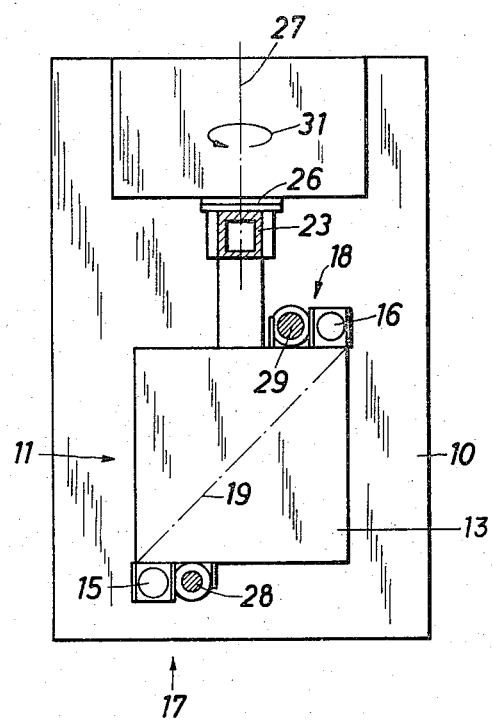
FIG. 3 is a sectional view of FIG. 1 along the line A–B.

The device represented in FIGS. 1-3, comprises the frame 10, the U-shaped bow 23 and the mold support 11. The mold support 11 is pivotably mounted at both of its ends 21,22 along the line of the first axis 20, in the arms 24,25 of the U-shaped bow 23. In addition, the U-shaped bow 23 is pivotably mounted, on its rear stem side 26, on the frame 10, along the second axis 27. The mold support 11 is pivotable about the first axis 20 in the direction of the arrow 30 and the U-shaped bow 23 together with the mold support 11 mounted therein is pivotable about the second axis in the direction of the arrow 31.

In the embodiment represented in the figures, the first axis 20 is identical to the longitudinal axis of the mold support, which is advantageous in view of the mass to be moved when the mold support is pivoted about its first axis.

The mold support 11 comprises the table-like clamping plate 12, the pressure yoke 13, the traverse rod 14 and the two guide and displacement devices 17,18 for the pressure yoke 13.

The guide and displacement devices 17,18 for the pressure yoke 13, each comprise a guide rod 28(29) and a pressure cylinder 15(16); the guide rods 28,29 interconnecting the clamping plate 12 and the traverse rod 14.

All other devices and parts required for operating the device are not shown in the figures because they are already known.

The device which has been described with reference to the accompanying figures may also be used advantageously for the "Under-Surface-Process," and for producing a plurality of moldings in superposed molds.

In addition, with the mold support in an inclined or horizontal position, the device according to the invention permits the automatic removal of the foamed moldings, namely by means of a conveyor belt passing below the molding space or the mold support. The moldings, which are removed from the mold by means of an ejector device, fall onto this conveyor belt. A chute may be interposed if necessary.

I claim:

1. In a device for producing moldings from foamable plastics, more particularly, polyurethane, wherein a two-part mold is arranged in a mold support pivotable about at least a first axis disposed in the direction of closing of the mold and about a second axis arranged at right angles to the first axis in the center of concentration of the mold support and wherein the two ends of the first axis pass through the arms of a U-shaped bow which is disposed about the mold support and mounted on the frame on its rear stem side along the line of the second axis, the improvements comprising the mold support (11) has a table-shaped clamping plate (12), a pressure yoke (13), a a traverse bar (14), and two guide and displacement devices (17,18) for the pressure yoke (13); said guide and displacement devices (17,18) being arranged opposite each other in an off-set position approximately along the line of a diagonal (19) of the clamping plate (12) and the guide rods (28,29) of the guide and displacement devices (17,18) interconnecting the clamping plate (12) and the traverse bar (14).

2. A device according to claim 1, characterized in that the first axis (20) is the longitudinal axis of the mold support (11).